(12) United States Patent
Strathmeyer et al.

(10) Patent No.: US 7,907,601 B2
(45) Date of Patent: *Mar. 15, 2011

(54) APPARATUS AND METHOD FOR COMPUTER CONTROLLED CALL PROCESSING AND INFORMATION PROVISION

(75) Inventors: Carl R. Strathmeyer, Reading, MA (US); Donald Finnie, Reading (GB)

(73) Assignee: Intel Corporation, Santa Clara, CA (US)

( * ) Notice: Subject to any disclaimer, the term of this patent is extended or adjusted under 35 U.S.C. 154(b) by 1229 days.

This patent is subject to a terminal disclaimer.

(21) Appl. No.: 11/476,403

(22) Filed: Jun. 27, 2006

(65) Prior Publication Data

US 2007/0019632 A1    Jan. 25, 2007

Related U.S. Application Data

(63) Continuation-in-part of application No. 09/723,747, filed on Nov. 28, 2000, now Pat. No. 6,901,068, which is a continuation-in-part of application No. 08/955,834, filed on Oct. 21, 1997, now Pat. No. 6,201,805, and a continuation-in-part of application No. 09/805,501, filed on Mar. 13, 2001.

(51) Int. Cl.
    *H04L 12/66*    (2006.01)

(52) U.S. Cl. ......................................................... 370/352
(58) Field of Classification Search ........................ None
    See application file for complete search history.

(56) References Cited

U.S. PATENT DOCUMENTS

| | | | |
|---|---|---|---|
| 6,201,805 B1 * | 3/2001 | Strathmeyer ................... 370/356 |
| 6,876,633 B2 * | 4/2005 | Strathmeyer et al. ......... 370/260 |
| 6,901,068 B1 * | 5/2005 | Strathmeyer et al. ......... 370/356 |
| 7,068,648 B2 * | 6/2006 | Strathmeyer et al. ......... 370/352 |
| 7,072,308 B2 * | 7/2006 | Strathmeyer et al. ......... 370/259 |
| 7,333,798 B2 * | 2/2008 | Hodge ....................... 379/142.05 |
| 2002/0085534 A1 * | 7/2002 | Williams et al. ............... 370/352 |
| 2002/0181460 A1 * | 12/2002 | Strathmeyer et al. ......... 370/389 |
| 2003/0198321 A1 * | 10/2003 | Polcyn ....................... 379/88.01 |

* cited by examiner

*Primary Examiner* — Anh-Vu Ly
(74) *Attorney, Agent, or Firm* — Kacvinsky Daisak PLLC

(57) ABSTRACT

A method and apparatus are presented for transmitting, from an application computer in communication with a gatekeeper which is connected to a data network, messages indicative of telephone calls in progress at an endpoint of the data network, or indicative of such endpoint, and transmitting, from the gatekeeper to the application computer, messages indicative of a variety of information contained in the telephone calls so as to process such information for a variety of applications. The invention contains a method for providing to a user of the system information relative to the incoming caller and to the subject of the call.

34 Claims, 4 Drawing Sheets

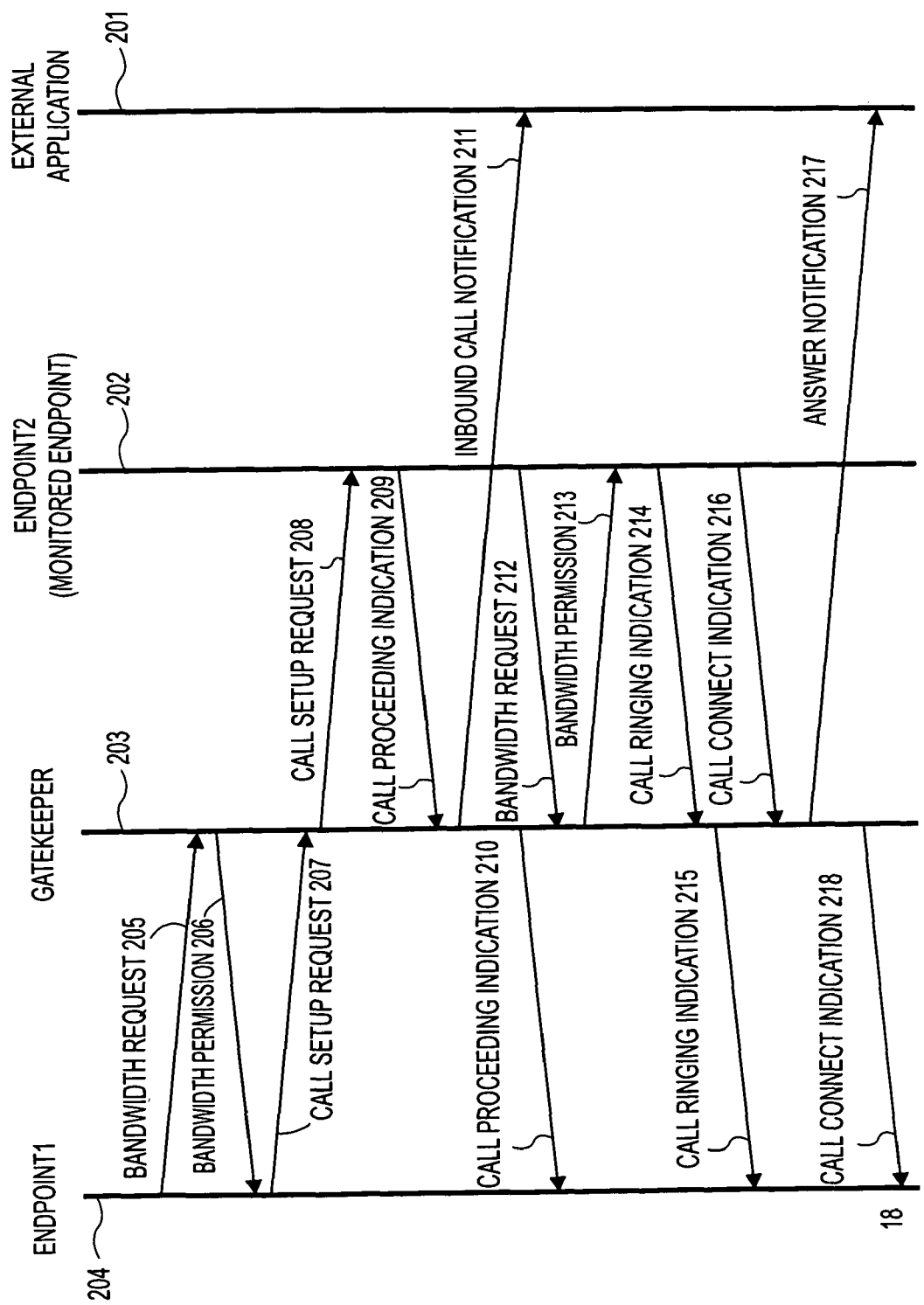

APPARATUS AND METHOD FOR COMPUTER CONTROLLED CALL PROCESSING AND INFORMATION PROVISION

CROSS-REFERENCE TO RELATED APPLICATIONS

This application is a continuation-in-part of each of pending U.S. patent application Ser. Nos. 09/723,747, filed Nov. 28, 2000, and Ser. No. 09/805,501, filed Mar. 13, 2001, each of which is itself a continuation-in-part of U.S. patent application Ser. No. 08/955,834, filed on Oct. 21, 1997, now issued as U.S. Pat. No. 6,201,805.

TECHNICAL FIELD

This invention relates to computer telephone integration (CTI) and, more specifically, to an improved method and apparatus for utilizing CTI techniques to process telephone calls using various applications in a packet switched telephone network.

BACKGROUND OF THE INVENTION

Telephony over packet networks, particularly over wide area networks such as the Internet, has received considerable attention in recent years. Specifically, scientists have begun exploring the possibility of sending voice and video information streams over packet switched data networks. The transmission of such information streams over packet switched networks can be more cost efficient than traditional telephony, which requires a dedicated circuit between the calling and called party. Transmitting voice information on the data network also removes the requirement to have a separate voice/telephony network.

Computer telephone integration has been widely applied to traditional telephony methods and apparatus, but has not as yet been successfully applied to the methods and apparatus used for packet network telephony. This invention specifies novel apparatus and methods, supplementary to known packet network telephony apparatus and methods, which enable CTI capabilities in such an environment, and use them to process telephone calls. In particular, the invention described herein enables packet network control by a third party which is deemed to be preferable to first party control systems.

One possible set of methods and apparatus for completing calls over a packet switched network, which include calls for transmitting voice and other information streams, is defined by ITU standard H.323. The H.323 standard is published by the International Telecommunication Union, of Geneva, Switzerland. The H.323 standard defines various protocols dealing with call control, call setup, call termination, and other similar techniques known to those in the packet network telephony art.

The H.323 standard defines a functional entity called a gatekeeper. The gatekeeper handles network functions such as bandwidth control, zone management, address translation, and admissions control for a designated set of network terminals. While all these functions are further defined in the previously cited standard, two examples are set forth below.

Bandwidth control provides a protocol by which the gatekeeper allocates a particular amount of network bandwidth to a particular connection. The gatekeeper can be contacted by either the calling or called party in order to request a change in the amount of bandwidth allocated to a particular call, for example, because one endpoint only has access to a limited set of voice codecs.

As another example, the gatekeeper performs zone management. This function, as further defined in the H.323 standard, provides a mechanism for allocating sets of different terminals and other nodes in the network to a particular gatekeeper. The H.323 standard provides a mechanism for dynamically altering the allocation of different network nodes to different gatekeepers.

The gatekeeper function provides services analogous to the call processing function within a private branch exchange (PBX) in conventional telephony. In traditional telephony, CTI features are provided by creating an interface between external application software and the call processing function within the PBX. By contrast, in the known packet network telephony art interfaces to the gatekeeper are only defined from other gatekeepers, end points, and other network entities.

Utilizing and building upon the call processing functions of an H.323 gatekeeper, or an analogous entity defined by other packet switched data network standard, call processing applications commonly known in conventional telephony can be implemented in a packet switched data network. The present invention describes the implementation of the acquisition and display of information pertaining to an initiating caller in a telephone communications session to users. Such functionalities are commonly known in conventional telephony as "Screen Pop", "Caller ID", and the like.

BRIEF DESCRIPTION OF THE DRAWINGS

FIG. 2 shows exemplary message flow between system elements during the establishment of an inbound call that is detected by an external software application using the packet network telephony system as enhanced and extended by the present invention.

DETAILED DESCRIPTION OF THE PREFERRED EMBODIMENT

For illustrative purposes the present invention will be described using the H.323 protocol and its defined entity, the "gatekeeper." Such exemplification is not intended in any way to limit the scope of the invention, which is intended to include, and could just as well be described using, any of a number of other packet network telephony protocols and their analogous entity or entities to the H.323 gatekeeper, end point, applications computer, etc.

Figure 1:
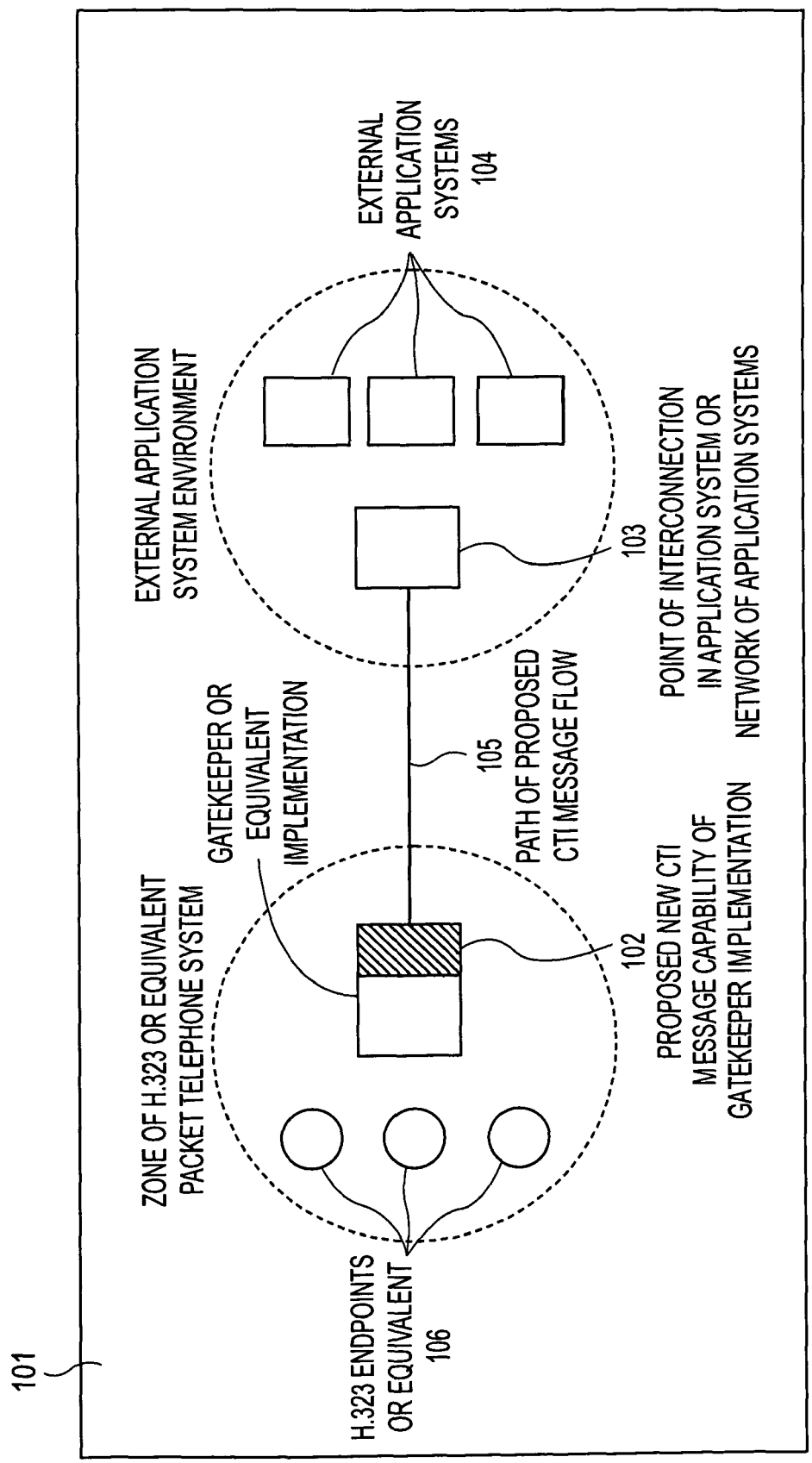
FIG. 1 shows a conceptual overview of an exemplary embodiment of the present invention as incorporated into a packet network telephony system.

FIG. 1 illustrates an overview of the interconnection of the gatekeeper computer 102 with the applications computer 103 according to the teachings of the present invention. To enable such interconnection, gatekeeper computer 102 is enhanced and extended by the addition of software whose functions are described below. Communications path 105 may be any type of data communications path, for example electrical, optical, wireless, etc.

The arrangement of FIG. 1 includes several external telephony applications systems 104, typically implemented as software, which are located on applications computer 103 or on separate computers connected via any communications network to applications computer 103. Typically, the applications computer is collocated with one of the end points described below.

The arrangement of FIG. 1 also includes end points 106, which may be personal computers, network computer devices (NCs), or any other node capable of interconnection to the packet network telephony environment.

In operation, a command is issued in response to an applications computer 103 requesting certain telephony services which will be described below. The message requesting such a service is transmitted through path 105 to gatekeeper computer 102 for processing. The message sent to gatekeeper 102 causes gatekeeper 102 to exchange appropriate signaling messages with other packet network telephony environment nodes in a manner as described, for example, in the incorporated H.323 standard. As a result of this sequence of events, the combined system is able to implement the call processing functionality requested by applications computer 103 on behalf of applications 104.

During operation, various call control functions requested by applications computer 103 are performed by the gatekeeper 102. Additionally, by making appropriate requests of gatekeeper 102, applications computer 103 may monitor the outcome of various call control functions and transmit such outcome to any of applications 104.

FIG. 2 shows an exemplary message flow diagram for detecting an inbound call from a remote end point to a local end point supervised by an external computer telephony application using the present invention. The specific example illustrated in FIG. 2 is the monitoring of an incoming call to end point 202 using packet network telephony methods and apparatus as described in the H.323 standard, enhanced by the present invention to permit the participation of an external software application 201. End points 202 and 204 represent audio terminals, for example, computer systems equipped as H.323 compliant telephone devices. Gatekeeper 203 is as described, for example, in the H.323 standard and as further enhanced by the present invention, and external application 201 is located on a separate computer as previously discussed.

In operation, the call initially proceeds according to the methods of the packet network telephony environment. A bandwidth request message 205 is sent to gatekeeper 203 and bandwidth is granted by the gatekeeper at message 206. A call setup request, message 207, is issued by the initiating end point 204, and gatekeeper 203 causes call setup request message 208 to be transmitted to receiving end point 202. A call proceeding indication message 209 is transmitted by the receiving end point back to gatekeeper 203 and then relayed therefrom to initiating end point 204 as shown.

At approximately the same time that gatekeeper 203 relays the call proceeding indication to the initiating end point 204 using message 210, gatekeeper 203 also transmits to external application 201 a notification 211 that an inbound call is being received by the receiving end point 202. Gatekeeper 203 sends this message because external application 201 has previously indicated that it requires notification of telephony events occurring at receiving end point 202.

In order to connect the inbound call, receiving end point 202 requires network bandwidth, and such bandwidth is requested from and allocated by the gatekeeper 203 using messages 212 and 213. Next, the terminal at monitored end point 202 rings to alert the user to the arriving call, and an indication of such ringing is transmitted through messages 214 and 215 to initiating end point 204 through the gatekeeper 203. When the call is connected at the receiving end point 202 because of user action there, receiving end point 202 informs gatekeeper 203 via call connect indication message 216.

At this point, gatekeeper 203 sends an answer notification to the external application 201 via message 217.

At approximately the same time, gatekeeper 203 indicates to the initiating end point 204 that the requested call has been connected via message 218.

In accordance with the protocol described hereinbefore, the detection of the call by an external application is accomplished via a protocol of messages transmitted between the gatekeeper and the end points to be connected, as well as between the gatekeeper 203 and the external application 201, thus enabling gatekeeper 203 to inform external application 201 regarding the progress of relevant calls in the packet telephony network.

Figure 3A:
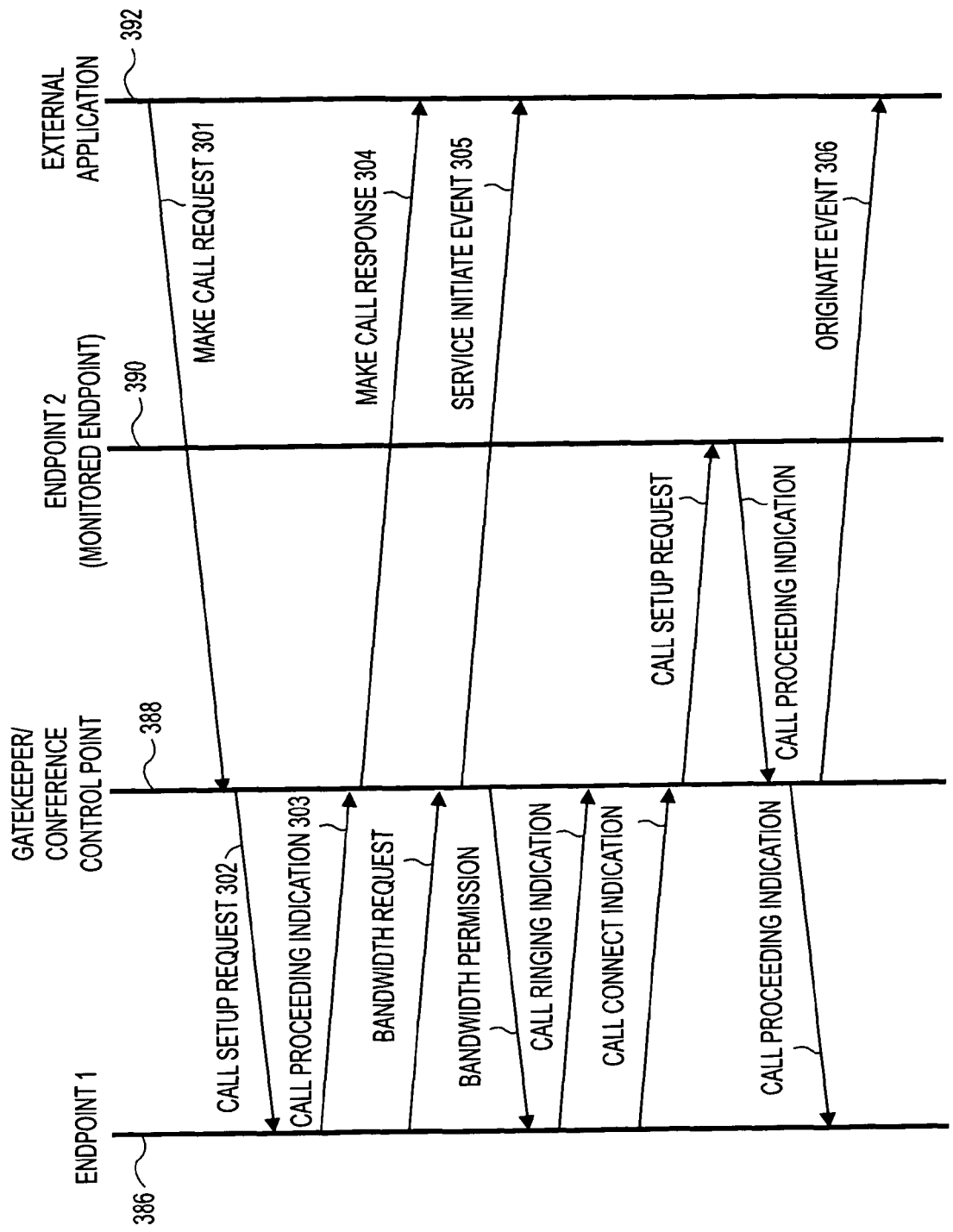
FIGS. 3A and 3B depict an exemplary message flow diagram utilizing the invention to establish an outbound call requested by an external software application in a similar environment.
Figure 3B:
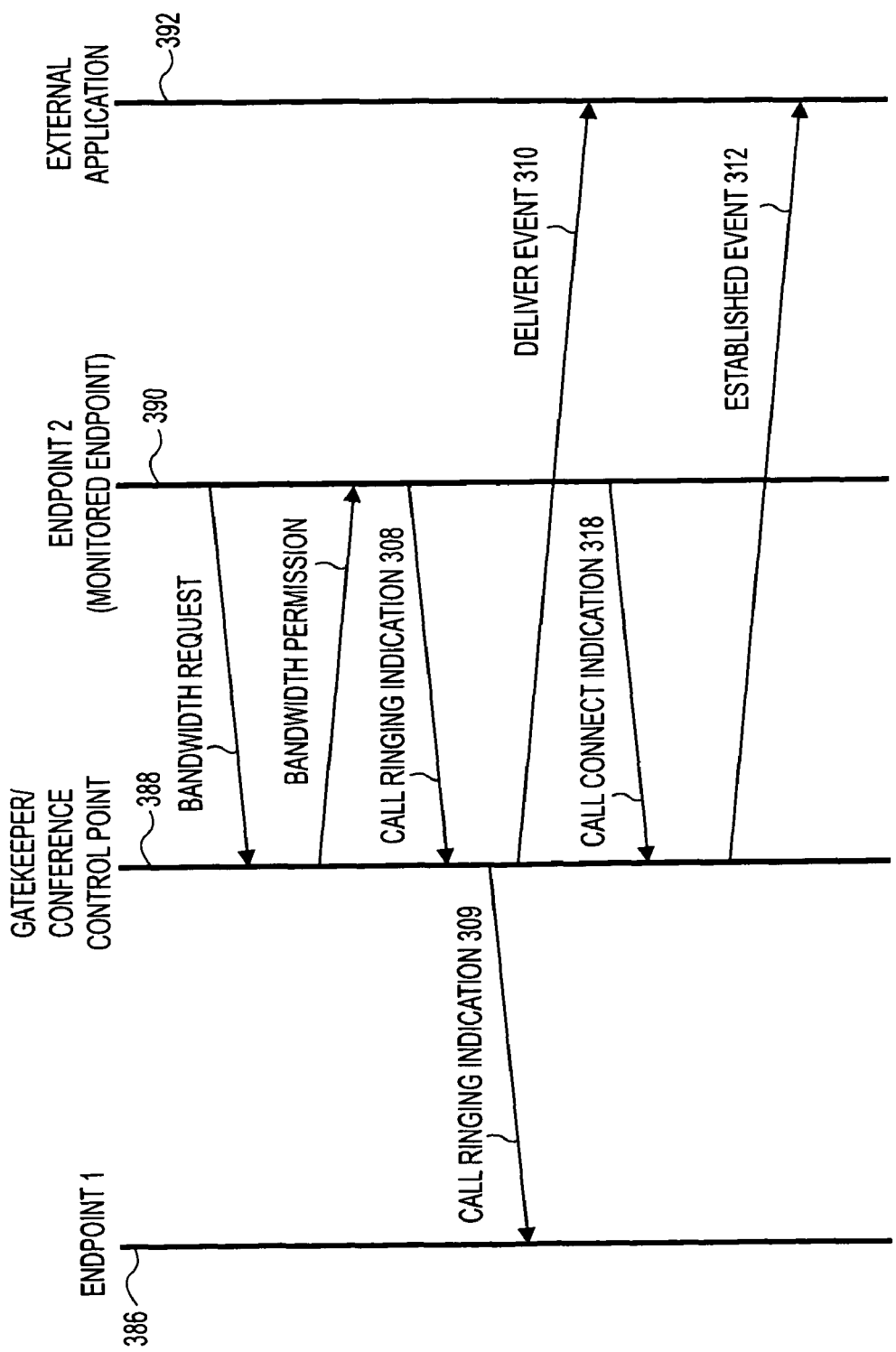

FIGS. 3A and 3B show another example of an external call processing application requesting the establishment of an outbound call from initiating end point 366 to receiving end point 390. Many of the messages involved in this operation are substantially similar to those previously set forth with respect to the monitoring of the inbound call described in FIG. 2. New messages not previously discussed in FIG. 2 are described below. As with the discussion of FIG. 2, the external application 392 in FIGS. 3A and 3B is assumed to have previously communicated with gatekeeper 388 in accordance with other methods described by this invention to indicate its intention to issue call control requests with respect to initiating end point 366.

In FIGS. 3A and 3B, gatekeeper 388 also includes the conference control point function as currently known to the packet network telephony art. This function is used by the invention to interconnect two call segments, namely the segment between the initiating end point 366 and the conference control point, gatekeeper 388; and between the conference control point 388 and the receiving end point 390. The invention connects the call in two stages in order to overcome certain limitations of the known packet network telephony art. For clarity of description, the combined gatekeeper and conference control point apparatus is referred to as a gatekeeper 388.

The sequence of messages begins with a new message 301, specified by the current invention, through which the external application 392 makes a request that the first segment of the call be established from gatekeeper 388 to initiating end point 366.

Next, according to known packet network telephony art, messages 302 and 303 are exchanged between gatekeeper 388 and initiating end point 366 in order to set up the first leg of the call.

Next, the gatekeeper 388 sends a new message 304 to external application 392 to alert application 392 that the call request has been received and is being processed. Much of the remaining signaling, relating to the establishment of that segment of the call between initiating end point 366 and gatekeeper 388 in FIGS. 3*a* and 3*b*, is substantially similar to that previously described with respect to FIG. 2 and thus will not be repeated. Similarly, once the first leg of the call has been set up, gatekeeper 388 proceeds in similar fashion to set up the second leg of the call from itself to receiving end point 390.

However, during the process depicted in FIGS. 3A and 3B gatekeeper 388 sends new messages to the external application 392 at relevant stages of call processing, including:

1. Message 305 indicating that initiating end point 366 has acquired the necessary network bandwidth to place the call;

2. Message 306 indicating that receiving end point 390 is processing the request for the call;
3. Message 310 indicating that receiving end point 390 is alerting its user to the arriving call; and
4. Message 312 indicating that receiving end point 390 has answered the call and a connection has been established.

In a further embodiment, a call is established by a controller, for example gatekeeper 388, in the packet telephony network described above to connect with a user of the system, i.e. intended call recipient 390. At the same time as the call is established, information useful for caller identification is obtained by access to the caller's connection. A useful piece of data for identification of the caller is the caller's telephone number, which is commonly available through the service known as Caller ID (identification). If the caller's telephone number is recorded in the database of application 392, this information may be used to locate additional information about the caller. As seen in FIG. 3B, an established event notice 312 is sent by gatekeeper 388 to external application 392 as a confirmation that the call is connected. External application 392 accesses the caller through the telephone number which it uses to search known contact files stored in memory to determine the identity of the caller. Once the caller's identity is known, external application 392 is able to provide the call recipient at endpoint 390 the identity of the caller, along with other significant information, such as the caller's recent ordering patterns, status of current projects, payment record, etc.—essentially any information that can be extracted from the caller's stored history—thus enabling the system user to maximize the value of the communication.

In a still further embodiment, a packet transmitted call is routed from an external network connection to an internal automatic call distributor (ACD) which is programmed to acquire information from the caller at initiating endpoint 386 in response to recorded prompts, such as nature of inquiry, department desired, and account number, for example. The caller responds to the recorded prompts by speaking into a microphone connected to a voice recognition program or by typing on the phone's keypad. Based on the information thus provided, external application 392 obtains pertinent information from accessible files in a memory device and links the information to the call. The call is assigned an identifying number or code and cached into a queue to await transfer to an available system user. When a system user becomes available, the call can be accessed by use of the assigned identifying number or code. Similarly, the system user is able to bring the retrieved information onto the screen through established links under the number or code.

The information located by external application 392 with respect to a caller is available for display on a monitor or similar device. The information can be displayed automatically on the monitor by external application 392 at the time the call is connected, or it can be held by the application 392 until actuated for display by the user of the system.

The caller information retrieved and displayed can be general or somewhat specific. General information may be in the nature of names of customer personnel, customer business information, products or services previously ordered, etc. Specific customer information may be accessed, for example, if the calling customer indicates, in response to recorded prompts, that the call is for, e.g. a billing matter. In the example present, external application 392 will access and display to the user the accounting files for this customer. Additional specific areas are, for example, open orders with delivery promise information, active development projects for, or problems encountered by, this customer, etc.

This support to the user of the system permits prompt access to customer account information, open customer orders and ordering pattern, and other pertinent information. Fortified with the information provided by the system in connection with a packet transmitted call, the call recipient can more quickly and efficiently respond to customer queries and concerns.

The above describes the preferred embodiments of the invention. It will be appreciated however that various other modifications or additions will be apparent to those of ordinary skill in the art. All such modifications and variations are considered to be within the scope of the invention disclosed.

What is claimed is:

1. A method, comprising:
   establishing rules for automatically routing an incoming call based on information acquired from a caller at an initiating endpoint;
   transmitting over a packet data network information pertaining to said incoming call to a receiving endpoint indicative of telephony monitoring and control functions from an application computer to a gatekeeper, said application computer being located separately from at least two nodes of said packet data network;
   routing said incoming call through said gatekeeper to connect to a selected endpoint of said packet data network according to said established rules;
   informing said application computer of an identity of an incoming caller;
   providing to a user information relating to said incoming caller; and
   causing a packetized telephone communications session between said at least two nodes of said packet data network to occur.

2. The method of claim 1, further comprising:
   transmitting a notification request of telephony events occurring at said receiving endpoint from said application computer to said gatekeeper; and
   transmitting a notification that said incoming call is being received by said receiving endpoint from said gatekeeper to said application computer.

3. The method of claim 1, wherein said information acquired from a caller is in response to recorded prompts.

4. The method of claim 3, wherein said information acquired from a caller is acquired by at least one of a caller speaking into a microphone connected to a voice recognition program in response to said recorded prompts or said caller typing on a phone keypad in response to said recorded prompts.

5. The method of claim 3, wherein said recorded prompts address at least one of a nature of inquiry, department desired or account number.

6. The method of claim 1, further comprising:
   assigning an identifier to said incoming call; and
   caching said incoming call and said information acquired from said caller for later retrieval.

7. The method of claim 3, further comprising:
   obtaining further information about said caller from a memory device; and
   linking said further information to said call.

8. The method of claim 1, further comprising:
   determining a subject matter of said incoming call and obtaining information relating to said subject matter; and
   displaying information relating to said caller and to said subject matter.

9. The method of claim 1, further comprising displaying information on a monitor that is accessible to a user.

10. The method of claim 1, further comprising utilizing indicia from said incoming call to identify said caller.

11. The method of claim 10, wherein said indicia comprises a telephone number of said caller.

12. An article comprising a non-transitory computer readable medium having storing computer executable instructions stored thereon which when executed by a processor causes:
  establishing rules for automatically routing an incoming call based on information acquired from a caller at an initiating endpoint;
  transmitting over a packet data network information pertaining to said incoming call to a receiving endpoint indicative of telephony monitoring and control functions from an application computer to a gatekeeper, said application computer being located separately from at least two nodes of said packet data network;
  routing said incoming call through said gatekeeper to connect to a selected endpoint of said packet data network according to said established rules;
  informing said application computer of an identity of an incoming caller;
  providing to a user information relating to said incoming caller; and
  causing a packetized telephone communications session between said at least two nodes of said packet data network to occur.

13. The article of claim 12, further comprising:
  transmitting a notification request of telephony events occurring at said receiving endpoint from said application computer to said gatekeeper; and
  transmitting a notification that said incoming call is being received by said receiving endpoint from said gatekeeper to said application computer.

14. The article of claim 12, wherein said information acquired from a caller is in response to recorded prompts.

15. The article of claim 14, wherein said information acquired from a caller is acquired by at least one of a caller speaking into a microphone connected to a voice recognition program in response to said recorded prompts or said caller typing on a phone keypad in response to said recorded prompts.

16. The article of claim 14, wherein said recorded prompts address at least one of a nature of inquiry, department desired or account number.

17. The article of claim 12, further comprising:
  assigning an identifier to said incoming call; and
  caching said incoming call and said information acquired from said caller for later retrieval.

18. The article of claim 14, further comprising:
  obtaining further information about said caller from a memory device; and
  linking said further information to said call.

19. The article of claim 12, further comprising:
  determining a subject matter of said incoming call and obtaining information relating to said subject matter; and
  displaying information relating to said caller and to said subject matter.

20. The article of claim 12, further comprising:
  displaying information on a monitor that is accessible to a user.

21. The article of claim 12, further comprising:
  utilizing indicia from said incoming call to identify said caller.

22. The article of claim 21, wherein said indicia comprises a telephone number of said caller.

23. An apparatus, comprising:
  an application computer to provide a user information acquired from a caller relating to telephone calls transmitted over a packet-switched data network under its control; and
  a gatekeeper to establish telephone calls over said packet-switched data network, and to receive instructions from, and send messages to, said application computer, said messages containing information about said caller.

24. The apparatus of claim 23 wherein:
  said gatekeeper to establish rules for automatically routing an incoming call based on information acquired from a caller at an initiating endpoint;
  said application computer to transmit to said gatekeeper over a packet data network information pertaining to said incoming call to a receiving endpoint indicative of telephony monitoring and control functions, said application computer being located separately from at least two nodes of said packet data network;
  said application computer to route said incoming call through said gatekeeper to connect to a selected endpoint of said packet data network according to said established rules, and
  said gatekeeper to inform said application computer of an identity of an incoming caller and cause a packetized telephone communications session between said at least two nodes of said packet data network to occur.

25. The apparatus of claim 24 wherein:
  said application computer to transmit to said gatekeeper a notification request of telephony events occurring at said receiving endpoint, and
  said gatekeeper to transmit to said application computer a notification that said incoming call is being received by said receiving endpoint.

26. The apparatus of claim 24, wherein said information acquired from a caller is in response to recorded prompts.

27. The apparatus of claim 26, wherein said information acquired from a caller is acquired by at least one of a caller speaking into a microphone connected to a voice recognition program in response to said recorded prompts or said caller typing on a phone keypad in response to said recorded prompts.

28. The apparatus of claim 26, wherein said recorded prompts address at least one of a nature of inquiry, department desired or account number.

29. The apparatus of claim 24 wherein:
  said application computer to assign an identifier to said incoming call, and to cache said incoming call and said information acquired from said caller for later retrieval.

30. The apparatus of claim 24 wherein
  said application computer to obtain further information about said caller from a memory device, and to link said further information to said call.

31. The apparatus of claim 24, further comprising:
  an automatic call distributor to determine a subject matter of said incoming call and obtaining information relating to said subject matter; and
  a monitor to display information relating to said caller and to said subject matter.

32. The apparatus of claim 24, further comprising a monitor to display information that is accessible to a user.

33. The apparatus of claim 24 wherein said application computer to utilize indicia from said incoming call to identify said caller.

34. The apparatus of claim 33, wherein said indicia comprises a telephone number of said caller.

* * * * *